US006645091B2

(12) United States Patent
Wu et al.

(10) Patent No.: US 6,645,091 B2
(45) Date of Patent: Nov. 11, 2003

(54) THERMOPLASTIC POLYURETHANE GOLF BALL WITH IMPROVED RESILIENCY

(75) Inventors: Shenshen Wu, North Dartmouth, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 166 days.

(21) Appl. No.: 09/756,761

(22) Filed: Jan. 10, 2001

(65) Prior Publication Data

US 2002/0098918 A1 Jul. 25, 2002

Related U.S. Application Data

(63) Continuation-in-part of application No. 09/311,591, filed on May 14, 1999, now Pat. No. 6,210,294.

(51) Int. Cl.$^7$ .......................... A63B 37/04; A63B 37/06
(52) U.S. Cl. .................. 473/377; 473/372; 473/378; 473/385; 528/66; 528/79; 524/839; 524/847; 525/129; 525/207; 525/208
(58) Field of Search ................. 473/372, 377, 473/378, 385; 525/129, 207, 208; 524/839, 847; 528/66, 79

(56) References Cited

U.S. PATENT DOCUMENTS

| 3,147,324 A | | 9/1964 | Ward | |
|---|---|---|---|---|
| 3,989,568 A | | 11/1976 | Isaac | 156/182 |
| 4,123,061 A | | 10/1978 | Dusbiber | 273/220 |
| 5,316,298 A | | 5/1994 | Hutin et al. | 273/78 |
| 5,334,673 A | | 8/1994 | Wu | 273/235 |
| 5,461,109 A | * | 10/1995 | Blair et al. | 524/839 |
| 5,575,472 A | | 11/1996 | Magerman et al. | 29/530 |
| 5,692,974 A | | 12/1997 | Wu et al. | 473/377 |
| 5,733,428 A | | 3/1998 | Calabria et al. | 264/134 |
| 5,744,549 A | * | 4/1998 | Lutz | 525/129 |
| 5,827,134 A | * | 10/1998 | Sullivan et al. | 473/372 |
| 5,856,388 A | * | 1/1999 | Harris et al. | 524/320 |
| 5,885,173 A | * | 3/1999 | Keller | 473/385 |
| 5,888,437 A | | 3/1999 | Calabria et al. | 264/135 |
| 5,908,358 A | * | 6/1999 | Wu | 473/378 |
| 5,976,035 A | * | 11/1999 | Umezawa et al. | 473/364 |
| 6,124,389 A | * | 9/2000 | Cavallaro et al. | 524/432 |
| 6,207,784 B1 | * | 3/2001 | Rajagopalan | 528/71 |
| 6,267,694 B1 | * | 7/2001 | Higuchi et al. | 473/374 |
| 6,277,034 B1 | * | 8/2001 | Nesbitt et al. | 473/372 |
| 6,486,261 B1 | * | 11/2002 | Wu et al. | 525/332.6 |
| 6,511,388 B1 | * | 1/2003 | Dewanjee | 473/377 |

FOREIGN PATENT DOCUMENTS

WO    WO 98/37929    9/1998

* cited by examiner

*Primary Examiner*—Peter Vo
*Assistant Examiner*—Paul D Kim
(74) *Attorney, Agent, or Firm*—Swidler Berlin Shereff Friedman, LLP

(57) ABSTRACT

A golf ball comprising a center, a cover, and optionally, at least one intermediate layer disposed between the center and the cover, wherein at least one of the cover and the at least one intermediate layer is formed with a thermoplastic polyurethane composition comprising a reaction product of at least one polyol and at least one diisocyanate, and a curing agent consisting essentially of at least one diol having the formula:

$$HOH_2CH_2C(OH_2CH_2C)_nO\text{—}X\text{—}O(CH_2CH_2O)_mCH_2CH_2OH;$$

wherein n and m, each separately have a value of 0, 1, 2, or 3, X is o-phenylene, m-phenylene, p-phenylene, 1,2-cyclohexyl, 1,3-cyclohexyl, 1,4-cyclohexyl; and mixtures a thereof.

41 Claims, No Drawings

THERMOPLASTIC POLYURETHANE GOLF BALL WITH IMPROVED RESILIENCY

CROSS-REFERENCE TO RELATED APPLICATIONS

This application is a continuation-in-part of application Ser. No. 09/311,591, filed May 14, 1999 now U.S. Pat. No. 6,210,294, which is incorporated herein by reference in its entirety.

FIELD OF THE INVENTION

The invention relates generally to golf balls and, more specifically, to golf balls having components such as cores, intermediate layers, and covers formed of a polymer blend comprising a thermoplastic polyurethane composition. The thermoplastic polyurethane composition comprises at least one diisocyanate and a polyol, as well as at least a diol curing agent or a secondary diamine curing agent. The golf balls of the present invention have been found to provide desired playing characteristics such as durability and improved resilience.

BACKGROUND OF THE INVENTION

Conventional golf balls can be divided into two general types or groups: solid balls and wound balls. The difference in play characteristics resulting from these different types of constructions can be quite significant. Balls having a solid construction are generally most popular with the average recreational golfer because they provide a very durable ball while also providing maximum distance. One-piece solid golf balls are well-known in the art. Other types of solid balls, also well known in the art, are made with a solid core, usually formed of a crosslinked rubber, which is encased by a cover material. Typically, solid cores are formed of polybutadiene that is chemically crosslinked with zinc diacrylate and/or similar crosslinking agents. The solid cores are covered by a tough, cut-proof cover, generally formed of a material such as SURLYN®, an ionomer resin produced by E. I. DuPont de Nemours and Co. of Wilmington, Del.

Ionomer resins have, to a large extent, replaced balata as a cover material. Chemically, ionomer resins are a copolymer of an olefin and an a,β-ethylenically-unsaturated carboxylic acid having 10–90% of the carboxylic acid groups neutralized by a metal ion. Commercially available ionomer resins include, for example, copolymers of ethylene and methacrylic or acrylic acid neutralized with metal salts, such as SURLYN®, and IOTEK® from Exxon Corporation. These ionomer resins are distinguished by the type of metal ion, the amount of acid, and the degree of neutralization.

Surrounding the core with an ionomeric cover material provides a ball that is virtually indestructible by golfers. Further, such a combination imparts a high initial velocity to the ball which results in improved distance. Because the materials of which the ball is formed are very rigid, solid balls generally have a hard "feel" when struck with a club. Likewise, due to their hardness, these balls have a relatively low spin rate which is another factor in providing greater distance.

It is well known in the art to modify the properties of a conventional solid ball by altering the typical single layer core and single cover layer construction to provide a multi-layer ball having such as a dual cover layer, dual core layer and/or a ball having a mantle layer disposed between the cover and the core. Like the solid cores, various cover layers, mantle layers, and intermediate layers are typically formed of polybutadiene which is chemically crosslinked with zinc diacrylate and/or similar crosslinking agents. The playing characteristics of multi-layer balls, such as "feel" and compression, can be tailored by varying the properties of one or more of these intermediate layers.

The wound ball, though, remains the preferred ball of more advanced players due to its spin and feel characteristics. Wound balls typically have either a solid rubber or liquid center core around which tensioned elastic thread or yam are wound. This wound core is then covered with a durable cover material, such as SURLYN®, or a softer cover material, such as balata or polyurethane. Balata is a natural or synthetic trans-polyisoprene rubber that is the favored cover material for highly-skilled golfers because of its softness. Wound balls are generally softer and provide more spin than non-wound balls, a characteristic that enables a skilled golfer to have more precise control over golf ball direction, flight profile, and distance. The enhanced control and stopping ability of a balata-covered, wound ball is particularly evident on approach shots into the green, where the high spin rate of these balls enables the golfer to stop the ball very near its landing position. Balata-covered balls, however, are easily damaged, and therefore lack the durability required by the recreational golfer.

A number of patents have been issued that are directed towards modifying the properties of layers used in forming conventional solid balls, multi-layer balls having dual cover layers, dual core layers and/or balls having a mantle layer disposed between the cover and the core, and wound balls. For example, polyurethanes have been recognized as useful materials for golf ball covers since as early as about 1960. U.S. Pat. No. 3,147,324 is directed to a method of making a golf ball having a polyurethane cover.

Thermoplastic polyurethane is the product of a reaction between at least one diisocyanate and at least one polyol, and a curing agent. The curing agents used in the thermoplastic polyurethane compositions are typically secondary diamines or diols. A catalyst is often employed to promote the reaction between the diisocyanate, polyol, and the secondary diamines or the diols. Typical catalysts include metal catalysts, such as bismuth, organic acids, such as acetic acid and oleic acid, heat-activated, delayed-action catalysts, such as POLYCAT SA-1 and POLYCAT SA-102, and other catalysts, such as triethylenediamine, and di-butyltin dilaurate.

Polyurethanes are typically divided into two categories: thermosets and thermoplastics. Thermoplastic polyurethanes are formed by the reaction of at least a diisocyanate, such as 4,4'-diphenylmethane diisocyanate or 3,3'-dimethyl-4,4'-biphenylene diisocyanate, and a polyol cured with a diol, such as 1,4-butanediol or a secondary diamine, such as Unilink 4200 or Clearlink 1000. Thermoset polyurethanes are formed by the reaction of a diisocyanate, such as 2,4-toluene diisocyanate or methylene-bis-4-cyclohexyl isocyanate, and a polyol which is cured with a polyamine (excluding secondary diamines), a triol such as trimethylol propane, or a tetrafunctional glycol, such as N,N,N',N'-tetrabis-2-hydroxypropyl ethylenediamine.

Since 1960, various companies have investigated the usefulness of polyurethane as a golf ball cover material. U.S. Pat. No. 4,123,061 teaches a golf ball made from a polyurethane prepolymer of polyether and a curing agent, such as a trifunctional polyol, a tetrafunctional polyol, or a diamine. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent and/or a difunctional glycol. The first commercially successful polyurethane covered golf ball was the Titleist® Professional ball, first released in 1993.

Unlike SURLYN® covered golf balls, polyurethane golf ball covers can be formulated to possess the soft "feel" of balata covered golf balls. However, golf ball covers made from polyurethane have not, to date, fully matched SURLYN® golf balls with respect to resilience or the rebound of the golf ball cover, which is a function of the initial velocity of a golf ball after impact with a golf club.

U.S. Pat. No. 3,989,568 discloses a three-component system employing either one or two polyurethane prepolymers and one or two polyol or fast-reacting diamine curing agents. The reactants chosen for the system must have different rates of reactions within two or more competing reactions.

U.S. Pat. No. 4,123,061 discloses a golf ball made from a polyurethane prepolymer of polyether and a curing agent, such as a trifunctional polyol, a tetrafunctional polyol, or a fast-reacting diamine curing agent.

U.S. Pat. No. 5,334,673 discloses a golf ball cover made from a composition of a thermosetting polyurethane prepolymer and a slow-reacting polyamine curing agent and/or a difunctional glycol. Resultant golf balls are found to have improved shear resistance and cut resistance compared to covers made from balata or SURLYN®.

U.S. Pat. No. 5,692,974 discloses methods of using cationic ionomers in golf ball cover compositions. Additionally, the patent relates to golf balls having covers and cores incorporating urethane ionomers. Improved resiliency and initial velocity are achieved by the addition of an alkylating agent such as t-butyl-chloride which induces ionic interactions in the polyurethane to produce cationic type ionomers.

International Patent Application WO 98/37929 discloses a composition for golf ball covers that comprises a blend of a diisocyanate/polyol prepolymer and a curing agent comprising a blend of a slow-reacting diamine and a fast-reacting diamine. Improved "feel", playability, and durability characteristics are exhibited.

Conventional polyurethane elastomers are known to have lower resiliency than SURLYN® and other ionomer resins. It has now been discovered that the use of a polyurethane composition, according to the present invention, in forming golf ball cores, intermediate and mantle layers, and/or covers, can raise the velocity of a golf ball prepared with the composition closer to the velocities observed with SURLYN®-covered golf balls. Additionally, the curatives used in the compositions of the present invention are less expensive than many curatives typically used by those of ordinary skill in the art, such as VERSALINK® P-250, an oligomeric diamine manufactured by Air Products and Chemicals, Inc. Moreover, the compositions of the present invention are less environmentally hazardous than other cost-effective options, such as ETHACURE® 300 and ETHACURE® 100.

SUMMARY OF THE INVENTION

The present invention is directed to a golf ball comprising a center, a cover, and optionally, at least one intermediate layer disposed between the center and the cover, wherein at least one of the cover and the at least one intermediate layer is formed with a thermoplastic polyurethane composition comprising a reaction product of at least one polyol and at least one diisocyanate, and a curing agent consisting essentially of at least one diol having the formula: $HOH_2CH_2C(OH_2CH_2C)_nO$—X—$O(CH_2CH_2O)_mCH_2CH_2OH$; wherein n and m, each separately have a value of 0, 1, 2, or 3, X is o-phenylene, m-phenylene, p-phenylene, 1,2-cyclohexyl, 1,3-cyclohexyl, or 1,4-cyclohexyl, and mixtures thereof. In a preferred embodiment, n and m each separately have a value of 1 or 2.

In another embodiment, the polyurethane composition further comprises at least one diol curing agent selected from the group consisting of ethylene glycol, diethylene glycol, polyethylene glycol, propylene glycol, 1,4-butanediol; 1,5-pentanediol, 1,4-cydohexane-dimethanol, 1,6-hexanediol, and polytetramethylene ether glycol having molecular weight less than 2000. In another embodiment, the thermoplastic polyurethane composition includes at least two curing agents. Additionally, the molecular weight of the diol curing agent should be at least about 50.

The diisocyanate is preferably 4,4'-diphenylmethane diisocyanate; polymeric 4,4'-diphenylmethane diisocyanate; liquid 4,4'-diphenylmethane diisocyanate; toluene diisocyanate; 3,3'-dimethyl-4,4'-biphenylene diisocyanate; p-phenylene diisocyanate; hexamethylene diisocyanate; p-tetramethylxylene diisocyanate; m-tetramethylxylene diisocyanate; naphthalene diisocyanate; 4,4'-dicyclohexylmethane diisocyanate; isophorone diisocyanate; m-phenylene diisocyanate; low free isocyanate monomers; and mixtures thereof.

The polyol may be polytetramethylene ether glycol; polyoxypropylene glycol; polyethylene adipate glycol; polyethylene propylene adipate glycol; and polybutylene adipate glycol; ortho-phthalate-1,6-hexanediol polyester polyol; diethylene glycol initiated polycaprolactone; trimethylol propane initiated polycaprolactone; neopentyl glycol initiated polycaprolactone; 1,4-butanediol-initiated polycaprolactone; 1,6-hexanediol-initiated polycaprolactone; saturated and unsaturated hydrocarbon polyols; hydroxy-terminated liquid isoprene rubber; hydroxy-terminated polybutadiene polyol; copolymers of the above mentioned polyols; and mixtures thereof.

In a preferred embodiment, the polyol is selected from the group consisting of polytetramethylene ether glycol; polyethylene adipate glycol; polybutylene adipate glycol; diethylene glycol initiated polycaprolactone; and mixtures thereof. In another embodiment, the molecular weight of the polyol is from about 200 to 4000.

It is preferred that the polyol is present in an amount of about 70 to 98 percent by weight of the diisocyante and the polyol, the diisocyanate is present in an amount of about 2 to 30 percent by weight of the diisocyanate and the polyol, and the diol curing agent is present in an amount of about 10 to 110 weight percent of the diisocyanate and the polyol. In yet another embodiment, the diisocyanate is present in an amount of about 2.5 to 12 percent by weight of the diisocyanate and the polyol. In a preferred embodiment, the thermoplastic polyurethane composition further includes at least one secondary diamine curing agent.

In another embodiment, the secondary diamine curing agent is selected from the group consisting of 4,4'-bis-sec-butylamino-diphenylmethane; 1,4-bis-sec-butylamino-benzene; 1,2-bis-sec-butylamino-benzene; derivatives of 4,4'-bis-sec-butylamino-diphenylmethane; 1,4-bis-sec-butylamino-cyclohexane; 1,2-bis-sec-butylamino-cyclohexane; 4,4'-bis-sec-butylamino-diclohexylmethane; derivatives of 4,4'-bis-sec-butylamino-dicyclohexylmethane; and mixtures thereof. In a preferred embodiment, the thermoplastic polyurethane composition includes a reaction product of 4,4'-diphenylmethane diisocyanate; polytetramethylene ether glycol; and mixtures of 1,3-bis-(2-hydroxyethoxy) benzene and 1,3-[bis-(2-hydroxyethoxy)]-diethoxy benzene. The cover may also include the thermoplastic polyurethane composition.

In one embodiment, the ball includes at least one intermediate layer includes the thermoplastic polyurethane composition. The center can be fluid-filled center, a solid center, a gel center, or a hollow center. The thermoplastic polyurethane composition may also include a density-modifying filler.

The present invention is also directed to a golf ball comprising a center, a cover, and optionally, at least one intermediate layer disposed between the center and the cover, wherein at least one of the cover and the at least one intermediate layer is formed with a thermoplastic polyurethane composition comprising a reaction product of at least one polyol and at least one diisocyanate, and a curing agent consisting of a secondary diamine. The thermoplastic polyurethane composition may include at least two curing agents.

Preferably, the diisocyanate is selected from the group consisting of 4,4'-diphenylmethane diisocyanate; polymeric 4,4'-diphenylmethane diisocyanate; liquid 4,4'-diphenylmethane diisocyanate; toluene diisocyanate; 3,3'-dimethyl-4,4'-biphenylene diisocyanate; p-phenylene diisocyanate; hexamethylene diisocyanate; p-tetramethylxylene diisocyanate; m-tetramethylxylene diisocyanate; naphthalene diisocyanate; 4,4'-dicyclohexylmethane diisocyanate; isophorone diisocyanate; m-phenylene diisocyanate; low free isocyanate monomers; and mixtures thereof.

In another embodiment, the polyol is selected from the group consisting of polytetramethylene ether glycol; polyoxypropylene glycol; polyethylene adipate glycol; polyethylene propylene adipate glycol; and polybutylene adipate glycol; ortho-phthalate-1,6-hexanediol polyester polyol; diethylene glycol initiated polycaprolactone; trimethylol propane initiated polycaprolactone; neopentyl glycol initiated polycaprolactone; 1,4-butanediol-initiated polycaprolactone; 1,6-hexanediol-initiated polycaprolactone; saturated and unsaturated hydrocarbon polyols; hydroxy-terminated liquid isoprene rubber; hydroxy-terminated polybutadiene polyol; copolymers of the above mentioned polyols; and mixtures thereof.

Preferably, the polyol is selected from the group consisting of polytetramethylene ether glycol; polyethylene adipate glycol; polybutylene adipate glycol; diethylene glycol initiated polycaprolactone; and mixtures thereof. The molecular weight of the polyol is preferably from about 200 to 4000.

In another embodiment, the polyol is present in an amount of about 70 to 98 percent by weight of the diisocyanate and the polyol, the diisocyanate is present in an amount of about 2 to 30 percent by weight of the diisocyanate and the polyol, and the secondary diamine curing agent is present in an amount of about 10 to 110 weight percent of the diisocyanate and the polyol. In a preferred embodiment, the diisocyanate is present in an amount of about 2.5 to 12 percent by weight of the diisocyanate and the polyol.

The secondary diamine curing agent may be 4,4'-bis-sec-butylamino-diphenylmethane; 1,4-bis-sec-butylamino-benzene; 1,2-bis-sec-butylamino-benzene; derivatives of 4,4'-bis-sec-butylamino-diphenylmethane; 1,4-bis-sec-butylamino-cyclohexane; 1,2-bis-sec-butylamino-cyclohexane; 4,4'-bis-sec-butylamino-diclohexylmethane derivatives of 4,4'-bis-sec-butylamino-dicyclohexylmethane; and mixtures thereof.

In yet another embodiment, the thermoplastic polyurethane composition includes a reaction product of 4,4'-dicyclohexylmethane diisocyanate, copolymer of polytetramethylene ether glycol and polycaprolactone, and 4,4'-bis-(sec-butylamino)-dicyclohexylmethane. In a preferred embodiment, the cover includes the thermoplastic polyurethane composition. In another preferred embodiment, the ball includes at least one intermediate layer including the thermoplastic polyurethane composition. The center may be a fluid-filled center, a solid center, a gel center, or a hollow center. Additionally, the thermoplastic polyurethane composition may include a density-modifying filler.

DESCRIPTION OF THE PREFERRED EMBODIMENTS

This invention is particularly directed towards golf balls having a core, a cover, and, optionally, an intermediate layer, wherein at least one of the cover and optional intermediate layer are formed of a thermoplastic polyurethane composition comprising the reaction product of at least one diisocyanate and at least one polyol, and a curing agent of at least one diol or a secondary diamine, preferably a blend of diol and secondary diamine curatives, wherein the resultant golf ball possesses improved resiliency and initial velocity as well as durability. The invention is also directed towards the use of the thermoplastic polyurethane composition in producing golf-related equipment, such as in an insert for a golf club, as well as in the golf balls discussed herein.

Golf balls formed according to the invention may have a one-piece construction formed from a homogeneous mass consisting entirely of the thermoplastic polyurethane composition of the invention. Such balls may further include, if desired, blends of conventional golf ball cover and/or intermediate layer materials, such as those discussed herein. One-piece balls, formed with the materials disclosed herein, are quite durable, but do not provide great distance because of relatively high spin and low velocity. A more preferred aspect of the present invention includes two-piece, multi-component, and wound balls having cores, liquid centers, intermediate layers, and/or covers comprising thermoplastic polyurethane blends of the type disclosed herein.

As used herein, the term "golf ball core" can be used to refer to any portion of a golf ball contained within the cover. In the case of a golf ball having three or more layers, the term "golf ball core" includes at least one inner layer and typically refers to a center and at least one intermediate layer. Such balls are known as "dual core" golf balls. The center may be solid, gel, hollow, or fluid filled. The term "inner core" may be used interchangeably with "center" or "golf ball center", while the term "outer core" may be used interchangeably with "intermediate layer" or "at least one intermediate layer." For example, one optional type of intermediate layer is a tensioned elastomeric material wound about the center. When a tensioned elastomeric material is included as an intermediate layer, the compositions of the invention are preferably incorporated into the elastomeric material, the center, or both. An intermediate layer may be included within a ball having, for example, a single layer or multilayer cover, a single layer or multilayer core, both a single layer cover and core, or both a multilayer cover and a multilayer core. Intermediate layers of the type described above are sometimes referred to in the art, and, thus, herein as well, as an inner cover layer, as an outer core layer, or as a mantle layer.

The thermoplastic polyurethane composition of the present invention is preferably comprised of at least one diisocyanate, at least one polyol, and at least one diol curing agent having the following general chemical structure:

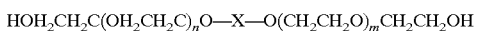

where n and m each separately have values of 0, 1, 2, or 3, and where X is o-phenylene, m-phenylene, p-phenylene, 1,2-cyclohexyl, 1,3-cyclohexyl, or 14-cyclohexyl. Preferably, the values of n and m are 1 or 2. The various phenylene structures are depicted in FIGS. 1–3 below.

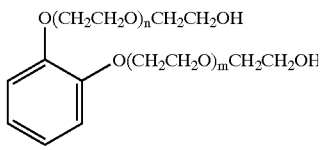

FIG. 1: o-phenylene

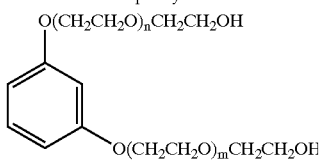

FIG. 2: m-phenylene

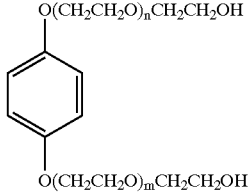

FIG. 3: p-phenylene

The thermoplastic polyurethane composition of the present invention contains at least one polyol. Suitable polyether polyols include, but are not limited to, polytetramethylene ether glycol, polyoxypropylene glycol, and mixtures thereof. Suitable polyester polyols include, but are not limited to, o-phthalate-1,6-hexanediol, polyethylene adipate glycol, polyethylene propylene adipate glycol, polybutylene adipate glycol, and mixtures thereof. Suitable polycaprolactone polyols include, but are not limited to, diethylene glycol initiated polycaprolactone; trimethylol propane initiated polycaprolactone; neopentyl glycol initiated polycaprolactone; 1,4-butanediol-initiated polycaprolactone; 1,6-hexanediol-initiated polycaprolactone; copolymers thereof; and mixtures thereof.

Suitable moisture resistant polyols include saturated and unsaturated hydrocarbon polyols, hydroxy-terminated liquid isoprene rubber, hydroxy-terminated polybutadiene polyol; copolymers and mixtures thereof. Preferred polyols for use with the invention include polytetramethylene ether glycol, polyethylene adipate glycol, polybutylene adipate glycol, and diethylene glycol initiated polycaprolactone; copolymers and mixtures thereof. In another embodiment, the molecular weight of the polyol is from about 200 to 4000.

The thermoplastic polyurethane composition of the present invention contains a diisocyanate. Suitable diisocyanates for use in the present invention include 4,4'-diphenylmethane diisocyanate ("MDI"); polymeric MDI; liquid MDI; toluene diisocyanate ("TDI"); 3,3'-dimethyl-4,4'-biphenylene diisocyanate ("TODI"); para-phenylene diisocyanate ("PPDI"); isophoronediisocyanate ("IPDI"); 4,4'-dicyclohexylmethane diisocyanate ("HMDI"); hexamethylene diisocyanate ("HDI"); p-tetramethylxylene diisocyanate ("p-TMXDI"); m-tetramethylxylene diisocyanate ("m-TMXDI"); naphthalene diisocyanate ("NDI"); m-phenylene diisocyanate ("MPDI"); low free isocyanate monomers; and mixtures thereof. Low free monomers have lower levels of "free" monomer isocyanate groups, typically less than about 0.1% free monomer groups. Examples include, but are not limited to, Low Free monomer MDI, Low Free monomer TDI, and Low Free monomer PPDI.

The diisocyanate is preferably present in an amount from about 2.5 to about 14 percent by weight of the diisocyanate and the polyol, more preferably, from about 2.5 to about 12 percent by weight of the diisocyanate and the polyol and most preferably, from about 5 to about 12 percent by weight of the diisocyanate and the polyol.

The thermoplastic polyurethane composition of the present invention comprises at least one diol curing agent. Suitable diol curatives for use in the present invention include at least one of 1,4-butanediol, ethylene glycol, diethylene glycol, polyethylene glycol, propylene glycol, 1,5-pentanediol, 1,6-hexanediol, lower molecular weight polytetramethylene ether glycol having average molecular weights between about 250 to 1000, and including mixtures thereof. Preferably, the polyurethane composition comprises a blend or mixture of diol curing agents. In one embodiment, the polyurethane composition contains a single diol curing agent. It is well-known in the art that 1,3-[bis-(2-hydroxyethoxy)]-diethoxy benzene may also be referred to as 2,2'-[1,3-phenylenebis oxy-2,1-ethanediyloxy] bis-ethanol. It is preferred that the at least one diol curing agent have a molecular weight of at least about 50.

In a preferred embodiment, the thermoplastic polyurethane composition comprises a reaction product of 4,4'-diphenylmethane diisocyanate; polytetramethylene ether glycol; and mixtures of 1,3-bis-(2-hydroxyethoxy) benzene and 1,3-[bis-(2-hydroxyethoxy)]-diethoxy benzene.

Optionally, secondary diamine curatives may be added to the thermoplastic polyurethane composition of the invention. Preferred secondary diamine curatives include, but are not limited to, 4,4'-bis-sec-butylamino-diphenylmethane; 1,4-bis-sec-butylamino-benzene; 1,2-bis-sec-butylamino-benzene; derivatives of 4,4'-bis-sec-butylamino-diphenylmethane; 1,4-bis-sec-butylamino-cyclohexane; 1,2-bis-sec-butylamino-cyclohexane; 4,4'-bis-sec-butylamino-dicyclohexylmethane; derivatives of 4,4'-bis-sec-butylamino-dicyclohexylmethane; and mixtures thereof.

In a preferred embodiment, the thermoplastic polyurethane composition comprises a reaction product of 4,4'-dicyclohexylmethane diisocyanate, copolymer of polytetramethylene ether glycol and polycaprolactone, and 4,4'-bis-(sec-butylamino)-dicyclohexylmethane.

Preferably, the polyol is present in an amount of about 70 to 98 percent by weight of the diisocyanate and the polyol, the diisocyanate is present in an amount of about 2 to 30 percent by weight of the diisocyanate and the polyol, and the diol and/or secondary diamine curing agent is present in an amount of about 10 to 110 weight percent of the diisocyanate and the polyol.

An optional filler component may be chosen to impart additional density to blends of the previously described components. The selection of such fillers is dependent upon the type of golf ball desired, i.e., one-piece, two-piece multi-component, or wound. Examples of useful fillers include zinc oxide, barium sulfate, calcium oxide, calcium carbonate and silica, as well as the other well known corresponding salts and oxides thereof. Additional fillers, such as foaming agents, glass spheres, and metal, can be added to the polyurethane compositions of the present invention, in amounts as needed, for their well-known purposes. Additional components which can be added to the thermoplastic polyurethane composition include UV stabilizers and other dyes, as well as optical brighteners and fluorescent pigments and dyes. Such additional ingredients may be added in any amounts that will achieve their desired purpose.

Core portions of golf balls formed according to the invention can be typically formed from a variety of elastomeric materials. A representative elastomer base composition for forming a portion of a golf ball core prepared in accordance with the present invention comprises a base rubber, a crosslinking agent and a filler. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. Crosslinking agents include metal salts of unsaturated fatty acids, such as zinc or magnesium salts of acrylic or methacrylic acid. The filler typically includes materials such as zinc oxide, barium sulfate, silica, calcium carbonate, metal, glass spheres and the like. The cores of golf balls formed according to the invention may be solid or hollow, fluid-filled or semi-solid filled, one-piece or multi-component cores, or they may, if desired, be wound.

In those embodiments wherein the cover or cover inner layer of the golf ball is formed with the thermoplastic polyurethane composition according to the invention, the cover is molded about the core in accordance with the teaching of U.S. Pat. Nos. 5,733,428 and 5,888,437, which are incorporated he The term "about," as used herein in connection with one or more numbers or numerical ranges, should be understood to refer to all such numbers, including all numbers in a range.

As used in the following example, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. However, when referring to the compression of a core, it is preferred to use a compressive load measurement.

EXAMPLES

The following example is provided for illustrative purposes only and is not to be construed as limiting the scope of the invention in any manner.

Example 1

Comparison of a Conventional Golf Ball with a Golf Ball Produced According to the Invention Prepared with a Diol Curing Agent Two identically-constructed golf balls were prepared, each comprising a liquid-filled center, a wound layer, and a cover. The first golf ball control formulation had a cover formed of a control formulation employing conventional polyurethane composition technology. In the second golf ball experimental formulation, the cover layer was formed with the thermoplastic polyurethane composition of the present invention, comprising a reaction product of 4,4'-diphenylmethane diisocyanate, polytetramethylene ether glycol and mixtures of 1,3-bis-(2-hydroxyethoxy) benzene and 1,3-[bis-(2-hydroxyethoxy)]-diethoxy benzene. A color dispersion was added to both formulations. The golf ball products were processed according to methods described in the U.S. Pat. Nos. 5,733,428 and 5,888,437. The formulations of both golf balls are set forth in Table 1 below.

TABLE I

Formulations

| Materials | Control Formulation | Experimental Formulation |
| --- | --- | --- |
| MDI - PTMEG Prepolymer[1] | 1 eq. | 1 eq. |
| HER-TG 250[2] | — | 0.95 eq. |
| VERSALINK ® P-250[3] | 0.95 eq. | — |
| Color Dispersion | 3.5% | 3.5% |

[1]MDI present in an about 9% and PTMEG present in about 91%
[2]Mixture of 1,3-bis-(2-hydroxyethoxy)benzene and 1,3-[bis-(2-hydroxyethoxy)]-diethoxy benzene, manufactured by Indspec Chemical Corporation
[3]An oligomeric diamine manufactured by Air Products and Chemicals, Inc.

As can be clearly seen in Table 2 below, the golf ball prepared according to the present invention Experimental Formulation had a 3.5 ft/s gain in initial velocity compared to the control golf ball. An increase of 3.5 ft/s in the golf ball initial velocity, as is well known to those of ordinary skill in the art, is a significant increase. In efforts to achieve initial velocity values as close as possible to the maximum limit of 255 ft/s, set by the USGA, the increase demonstrated above is extremely beneficial. Additionally, the golf ball prepared according to the present invention exhibited a significantly lower compression i.e., better "feel" yet retained the same hardness as the golf ball made with a control formulation. As is also recognized by those of ordinary skill in the art, a lower golf ball compression will result in lower driver spin, allowing the golf ball to more closely match ideal launch conditions for maximum distance.

TABLE 2

Golf Ball Properties

| Physical Properties | Control Formulation | Experimental Formulation |
| --- | --- | --- |
| Size, in: nameplate | 1.682 | 1.688 |
| Size, in: equator | 1.681 | 1.684 |
| Weight, oz | 1.600 | 1.599 |
| Compression, Atti | 93 | 86 |
| Cover Hardness, Shore D | 58 | 58 |
| Ball Initial Velocity, ft/s | 249.4 | 252.9 |

Example 2

Comparison of a Conventional Golf Ball with a Golf Ball Produced According to the Invention Prepared with a Secondary Diamine Curing Agent Two identically-constructed golf balls were prepared, each comprising a liquid-filled center, a wound layer, and a cover. The first golf ball control formulation had a cover formed of a control formulation employing conventional polyurethane composition technology. In the second golf ball experimental formulation, the cover layer was formed with the thermoplastic polyurethane composition of the present invention, comprising a reaction product of 4,4'-dicyclohexylmethane diisocyanate, polytetramethylene ether glycol and 4,4'-bis-(sec-butylamino)-dicyclohexylmethane. A color dispersion was added to both formulations. The golf ball products were processed according to methods described in the U.S. Pat. Nos. 5,733,428 and 5,888,437. The formulations of both golf balls are set forth in Table 3 below.

TABLE 3

| | Formulations | |
| Materials | Control Formulation | Experimental Formulation |
|---|---|---|
| MDI-PTMEG Prepolymer[1] | 1 eq. | |
| H$_{12}$MDI-PTMEG/ polycaprolactone Prepolymer[2] | | 1 eq. |
| CLEARLINK 1000[3] | — | 0.95 eq. |
| VERSALINK® P-250[4] | 0.95 eq. | — |
| Color Dispersion | 3.5% | 3.5% |

[1] MDI present in an about 8% and PTMEG present in about 92%
[2] H$_{12}$MDI present in about 8% and PTMEG/polycaprolactone present in about 92%
[3] An aliphatic secondary diamine manufactured by UOP LLC
[4] An oligomeric diamine manufactured by Air Products and Chemicals, Inc.

The golf ball properties, for both the conventional golf ball and the golf ball produced according to the invention, are set forth in Table 4 below:

TABLE 4

| | Golf Ball Properties | |
| Physical Properties | Control Formulation | Experimental Formulation |
|---|---|---|
| Size, in: nameplate | 1.684 | 1.691 |
| Size, in: equator | 1.684 | 1.687 |
| Weight, oz | 1.592 | 1.571 |
| Compression, Atti | 88 | 91 |
| Cover Hardness, Shore D | 56 | 59 |
| COR | 0.788 | 0.788 |

The thermoplastic polyurethane composition according to the present invention can be used for other golf equipment such as inserts for golf clubs. For example, such inserts can be in the face of a golf club, like that disclosed in U.S. Pat. No. 5,316,298 which is incorporated in its entirety by reference herein, or in the back cavity like that disclosed in U.S. Pat. No. 5,575,472 which is also incorporated in its entirety by reference herein.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-2240, between about 30 and about 60 Shore D, preferably from about 35 to about 55 Shore D. The inner cover layer, if present, preferably has a material hardness from about 50 to about 75 Shore D, preferably from about 60 to about 65 Shore D.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a center and a cover, wherein the cover is formed with a thermoplastic polyurethane composition comprising a reaction product of at least one polyol and at least one diisocyanate, and a curing agent consisting essentially of at least one diol having the formula:

HOH$_2$CH$_2$C(OH$_2$CH$_2$C)$_n$O—X—O(CH$_2$CH$_2$O)$_m$CH$_2$CH$_2$OH;

wherein n and m, each separately have a value of 0,1,2, or 3, X is o-phenylene, m-phenylene, p-phenylene, 1,2-cyclohexyl, 1,3-cyclohexyl, 1,4-cyclohexyl; and mixtures thereof.

2. The golf ball of claim 1, wherein n and m each separately have a value of 1 or 2.

3. The golf ball of claim 1, wherein the thermoplastic polyurethane composition further comprises at least one diol curing agent selected from the group consisting of ethylene glycol; diethylene glycol; polyethylene glycol; propylene glycol; 1,4-butanediol; 1,5-pentanediol; 1,4-cydohexane-dimethanol; 1,6-hexanediol; and polytetramethylene ether glycol having molecular weight less than 2000.

4. The golf ball of claim 1, wherein the thermoplastic polyurethane composition comprises at least two curing agents.

5. The golf ball of claim 1, wherein the curing agent has a molecular weight of about 50 or greater.

6. The golf ball of claim 1, wherein the at least one diisocyanate is selected from the group consisting of 4,4'-diphenylmethane diisocyanate; polymeric 4,4'-diphenylmethane diisocyanate; liquid 4,4'-diphenylmethane diisocyanate; toluene diisocyanate; 3,3'-dimethyl-4,4'-biphenylene diisocyanate; p-phenylene diisocyanate; hexamethylene diisocyanate; p-tetramethylxylene diisocyanate; m-tetramethylxylene diisocyanate; naphthalene diisocyanate; 4,4'-dicyclohexylmethane diisocyanate; isophorone diisocyanate; m-phenylene diisocyanate; low free isocyanate monomers; and mixtures thereof.

7. The golf ball of claim 6, wherein the at least one diisocyanate is liquid 4,4'-diphenylmethane diisocyanate.

8. The golf ball of claim 1, wherein the at least one polyol is selected from the group consisting of polytetramethylene ether glycol; polyoxypropylene glycol; polyethylene adipate glycol; polyethylene propylene adipate glycol; and polybutylene adipate glycol; ortho-phthalate-1,6-hexanediol polyester polyol; diethylene glycol initiated polycaprolactone; trimethylol propane initiated polycaprolactone; neopentyl glycol initiated polycaprolactone; 1,4-butanediol-initiated polycaprolactone; 16-hexanediol-initiated polycaprolactone; saturated and unsaturated hydrocarbon polyols; hydroxy-terminated liquid isoprene rubber; hydroxy-terminated polybutadiene polyol; copolymers of the above mentioned polyols; and mixtures thereof.

9. The golf ball of claim 8, wherein the at least one polyol has a molecular weight from about 200 to 4000.

10. The golf ball of claim 1, wherein the at least one polyol is selected from the group consisting of polytetramethylene ether glycol; polyethylene adipate glycol; polybutylene adipate glycol; diethylene glycol initiated polycaprolactone; and mixtures thereof.

11. The golf ball of claim 1, wherein the at least one polyol is present in an amount of about 70 to 98 percent by weight of the at least one diisocyanate and the at least one polyol; the at least one diisocyanate is present in an amount of about 2 to 30 percent by weight of the at least one diisocyanate and the at least one polyol; and the outing agent is present in an amount of about 10 to 110 weight percent of the at least one diisocyanate and the at least one polyol.

12. The golf ball of claim 11, wherein the at least one diisocyanate is present in an amount of about 2.5 to 12 percent by weight of the at least one diisocyanate and the at least one polyol.

13. The golf ball of claim 1, wherein the thermoplastic polyurethane composition further comprises at least one secondary diamine curing agent.

14. The golf ball of claim 13, wherein the at least one secondary diamine curing agent is selected from the group consisting of 4,4'-bis-sec-butylamino-diphenylmethane; 1,4-bis-sec-butylamino-benzene; 1,2-bis-sec-butylamino-benzene; derivatives of 4,4'-bis-sec-butylamino-diphenylmethane; 1,4-bis-sec-butylamino-cyclohexane; 1,2-bis-sec-butylamino-cyclohexane; 4,4'-bis-sec-butylamino-diclohexylmethane; derivatives of 4,4'-bis-sec-butylamino-dicyclohexylmethane; and mixtures thereof.

15. The golf ball of claim 1, wherein the thermoplastic polyurethane composition comprises a reaction product of 4,4'-diphenylmethane diisocyanate; polytetramethylene ether glycol; and mixtures of 1,3-bis-(2-hydroxyethoxy) benzene and 1,3-[bis-(2-hydroxyethoxy)]-diethoxy benzene.

16. The golf ball of claim 1, wherein the golf ball further comprises an intermediate layer disposed between the center and the cover.

17. The golf ball of claim 16, wherein the intermediate layer comprises a thermoplastic polyurethane composition.

18. The golf ball of claim 1, wherein the center is a fluid-filled center, a solid center, a gel center, or a hollow center.

19. The golf ball of claim 1, wherein the thermoplastic polyurethane composition further comprises a density-modifying filler.

20. A golf ball comprising a center and a cover, wherein the cover is formed with a thermoplastic polyurethane composition comprising a reaction product of at least one polyol and at least one diisocyanate, and a secondary diamine curing selected from the group consisting of 1,4-bis-(sec-butylamino)-cyclohexane: 1,2-bis-(sec-butylamino)-cyclohexane; 4,4'-bis-(sec-butylamino)-dicyclohexylmethane; derivatives of 4,4'-bis-(sec-butylamino)-dicyclohexylmethane; and mixtures thereof.

21. The golf ball of claim 20, wherein the thermoplastic polyurethane composition comprises at least two secondary diamine curing agents.

22. The golf ball of claim 20, wherein the at least one diisocyanate is selected from the group consisting of 4,4'-diphenylmethane diisocyanate; polymeric 4,4'-diphenylmethane diisocyanate; liquid 4,4'-diphenylmethane diisocyanate; toluene diisocyanate; 3,3'-dimethyl-4,4'-biphenylene diisocyanate; p-phenylene diisocyanate; hexamethylene diisocyanate; p-tetramethylxylene diisocyanate; m-tetramethylxylene diisocyanate; naphthalate diisocyanate; 4,4'-dicyclohexylmethane diisocyanate; isophorone diisocyanate; m-phenylene diisocyanate; low free isocyanate monomers; and mixtures thereof.

23. The golf ball of claim 20, wherein the at least one polyol is selected from the group consisting of polytetramethylene ether glycol; polyoxypropylene glycol; polyethylene adipate glycol; polyethylene propylene adipate glycol; and polybutylene adipate glycol; ortho-phthalate-1,6-hexanediol polyester polyol; diethylene glycol initiated polycaprolactone; trimethylol propane initiated polycaprolactone; neopentyl glycol initiated polycaprolactone; 1,4-butanediol-initiated polycaprolactone; 1,6-hexanediol-initiated polycaprolactone; saturated and unsaturated hydrocarbon polyols; hydroxy-terminated liquid isoprene rubber; hydroxy-terminated polybutadiene polyol; copolymers of the above mentioned polyols; and mixtures thereof.

24. The golf ball of claim 23, wherein the at least one polyol has a molecular weight from about 200 to 4000.

25. The golf ball of claim 23, wherein the at least one polyol is present in an amount of about 70 to 98 percent by weight of the at least one diisocyanate and the at least one polyol; the at least one diisocyanate is present in an amount of about 2 to 30 percent by weight of the at least one diisocyanate and the at least one polyol; and the secondary diamine curing agent is present in an amount of about 10 to 110 weight percent of the at least one diisocyanate and the at least one polyol.

26. The golf ball of claim 25, wherein the at least one diisocyanate is present in an amount of about 2.5 to 12 percent by weight of the at least one diisocyanate and the at least one polyol.

27. The golf ball of claim 20, wherein the at least one polyol is selected from the group consisting of polytetramethylene ether glycol; polyethylene adipate glycol; polybutylene adipate glycol; diethylene glycol initiated polycaprolactone; and mixtures thereof.

28. The golf ball of claim 20, wherein the thermoplastic polyurethane composition comprises a reaction product of 4,4'-dicyclohexylmethane diisocyanate, copolymer of polytetramethylene ether glycol and polycaprolactone, and 4,4'-bis-(sec-butylamino)-dicyclohexylmethane.

29. The golf ball of claim 20, wherein the golf ball further comprises an intermediate layer disposed between the center and the cover.

30. The golf ball of claim 20, wherein the intermediate layer is formed of tensioned elastomeric material.

31. The golf ball of claim 20, wherein the center is a fluid-filled center, a solid center, a gel center, or a hollow center.

32. The golf ball of claim 20, wherein the thermoplastic polyurethane composition futher comprises a density-modifying filler.

33. A golf ball comprising a center and a cover, wherein the cover is formed from a thermoplastic polyurethane composition comprising:
  a prepolymer comprising at least one polyol and liquid 4,4-diphenylmethane diisocyanate; and
  a curing agent.

34. The golf ball of claim 33, wherein the at least one polyol is selected from the group consisting of polytetramethylene ether glycol; polyoxypropylene glycol; polyethylene adipate glycol; polyethylene propylene adipate glycol; and polybutylene adipate glycol; ortho-phthalate-1,6-hexanediol polyester polyol; diethylene glycol initiated polycaprolactone; trimethylol propane initiated polycaprolactone; neopentyl glycol initiated polycaprolactone; 1,4-butanediol-initiated polycaprolactone; 1,6-hexanediol-initiated polycaprolactone; saturated and unsaturated hydrocarbon polyols; hydroxy-terminated liquid isoprene rubber; hydroxy-terminated polybutadiene polyol; copolymers of the above mentioned polyols; and mixtures thereof.

35. The golf ball of claim 33, wherein the at least one polyol is present in an amount of about 70 to 98 percent by weight of the prepolymer; the liquid 4,4'-diphenylmethane diisocyanate is present in an amount of about 2 to 30 percent by weight of the prepolymer; and the curing agent is present in an amount of about 10 to 110 weight percent of the prepolymer.

36. The golf ball of claim 33, wherein the liquid 4,4'-diphenylmethane diisocyanate is present in an amount of about 2.5 to 12 percent by weight of the prepolymer.

37. The golf ball of claim 33, wherein the curing agent comprises at least one secondary diamine curing agent, at least one diol curing agent, or mixtures thereof.

38. The golf ball of claim 37, wherein the at least one secondary diamine curing agent is selected from the group consisting of 4,4'-bis-sec-butylamino-diphenylmethane; 1,4-bis-sec-butylamino-benzene; 1,2-bis-sec-butylamino-benzene; derivatives of 4,4'-bis-sec-butylamino-diphenylmethane; 1,4-bis-sec-butylamino-cyclohexane; 1,2-bis-sec-butylamino-cyclohexane; 4,4'-bis-sec-butylamino-diclohexylmethane; derivatives of 4,4-bis-sec-butylamino-dicyclohexylmethane; and mixtures thereof.

39. The golf ball of claim 37, wherein the at least one diol curing agent is selected from the group consisting of ethylene glycol; diethylene glycol; polyethylene glycol; propylene glycol; 1,4-butanediol; 1,5-pentanediol; 1,4-cydohexane-dimethanol; 1,6-hexanediol; polytetramethylene ether glycol having molecular weight less than 2000; and mixtures thereof.

40. The golf ball of claim 33, wherein the curing agent comprises at least one diol having the formula:

$$HOH_2CH_2C(OH_2CH_2C)_nO-X-O(CH_2CH_2O)_mCH_2CH_2OH;$$

wherein n and m, each separately have a value of 0,1,2, or 3, X is o-phenylene, m-phenylene, p-phenylene, 1,2-cyclohexyl, 1,3-cyclohexyl, 1,4-cyclohexyl; and mixtures thereof.

41. The golf ball of claim 40, wherein the cover has a hardness of about 30 Shore D to about 60 Shore D.

* * * * *